(12) United States Patent
Hamilton et al.

(10) Patent No.: US 6,915,083 B1
(45) Date of Patent: Jul. 5, 2005

(54) SIGNAL RECEIVER HAVING WIDE BAND AMPLIFICATION CAPABILITY

(75) Inventors: T. Allan Hamilton, San Jose, CA (US); Alan Grace, South San Francisco, CA (US)

(73) Assignee: ZiLOG, Inc., San Jose, CA (US)

( * ) Notice: Subject to any disclaimer, the term of this patent is extended or adjusted under 35 U.S.C. 154(b) by 0 days.

(21) Appl. No.: 09/212,203

(22) Filed: Dec. 15, 1998

(51) Int. Cl.$^7$ .............................................. H04B 10/06
(52) U.S. Cl. ...................... 398/202; 398/135; 398/136; 398/137; 398/209; 398/210; 398/213; 398/214; 330/308; 330/59; 250/214 A; 250/214 R; 250/214 AG; 250/214 LA; 375/316; 375/317; 375/318
(58) Field of Search ................................ 398/202, 135, 398/136, 137, 209, 210, 213, 214; 330/308, 59, 282, 58, 60; 250/214 A, 214 R, 214 AG, 214 LA; 375/316, 317, 318; 359/152, 153, 189, 194, 195

(56) References Cited

U.S. PATENT DOCUMENTS

| | | | | |
|---|---|---|---|---|
| 4,498,001 A | * | 2/1985 | Smoot ...................... 250/214 A |
| 4,608,542 A | * | 8/1986 | Siegel ......................... 330/279 |
| 4,623,786 A | * | 11/1986 | Rodwell ................. 250/214 A |
| 4,743,856 A | * | 5/1988 | Keating ....................... 328/111 |
| 5,010,588 A | * | 4/1991 | Gimlett ....................... 455/619 |
| 5,251,054 A | * | 10/1993 | Lynn ........................... 359/189 |
| 5,363,064 A | * | 11/1994 | Mikamura ................... 330/308 |
| 5,455,705 A | * | 10/1995 | Gusinov ...................... 359/189 |
| 5,612,810 A | * | 3/1997 | Inami et al. ................. 359/189 |
| 5,646,573 A | * | 7/1997 | Bayruns et al. ............... 330/59 |
| 5,714,909 A | * | 2/1998 | Jackson ....................... 330/308 |
| 5,790,295 A | * | 8/1998 | Devon ......................... 359/189 |
| 5,880,631 A | * | 3/1999 | Sahota ......................... 330/51 |
| 5,907,422 A | * | 5/1999 | Ho et al. ..................... 359/189 |
| 6,018,407 A | * | 1/2000 | Hatakeyama et al. ........ 359/189 |
| 6,034,567 A | * | 3/2000 | Umezawa et al. ........... 330/253 |
| 6,037,823 A | * | 3/2000 | Arai et al. ................... 327/307 |
| 6,038,049 A | * | 3/2000 | Shimizu et al. ............. 359/189 |
| 6,052,030 A | * | 4/2000 | Garner et al. ............... 330/282 |
| 6,055,279 A | * | 4/2000 | Ota ............................. 375/319 |
| 6,057,736 A | * | 5/2000 | Kim et al. ................... 330/282 |
| 6,137,101 A | * | 10/2000 | Yokogawa et al. ..... 250/214 A |
| 6,175,601 B1 | * | 1/2001 | Rybicki et al. ............. 375/345 |
| 6,219,166 B1 | * | 4/2001 | Shang et al. ................ 359/189 |
| 6,304,357 B1 | * | 10/2001 | Ohhata et al. .............. 359/194 |
| 6,356,375 B1 | * | 3/2002 | Holcombe ................... 359/189 |
| 6,396,614 B1 | * | 5/2002 | Yoshizawa ................... 398/202 |

FOREIGN PATENT DOCUMENTS

EP          0868022          9/1998     ............ H03F/3/08

OTHER PUBLICATIONS

Campbell M et al ,A 10 MHz Miropower CMOS Front End For Direct Readout Of Pixel Detectors May 1, 1990.

* cited by examiner

Primary Examiner—Hanh Phan (57) ABSTRACT

An Improved Signal Receiver Having Wide Band Amplification Capability is disclosed. Also disclosed is a receiver that is able to receive and reliably amplify infrared and/or other wireless signals having frequency bandwidths in excess of 40 MHz. The receiver of the present invention reduces the signal-to-noise ratio of the received signal to ⅕th of the prior systems. The preferred receiver eliminates both the shunting resistor and the feedback resistor on the input end by amplifying the signal in current form. Furthermore, the receiver includes transconductance amplification means for amplifying the current signal without the need for Cascode stages. Finally, the receiver includes staged amplification to amplify the current signal in stages prior to converting the signal into a voltage output.

8 Claims, 10 Drawing Sheets

V1, I3 & C4 Simulate PIN Diode

SIGNAL RECEIVER HAVING WIDE BAND AMPLIFICATION CAPABILITY

BACKGROUND OF THE INVENTION

1. Field of the Invention

This invention relates generally to wireless signal transmission systems and, more specifically, to an Improved Signal Receiver Having Wide Band Amplification Capability.

2. Description of Related Art

Figure 1:
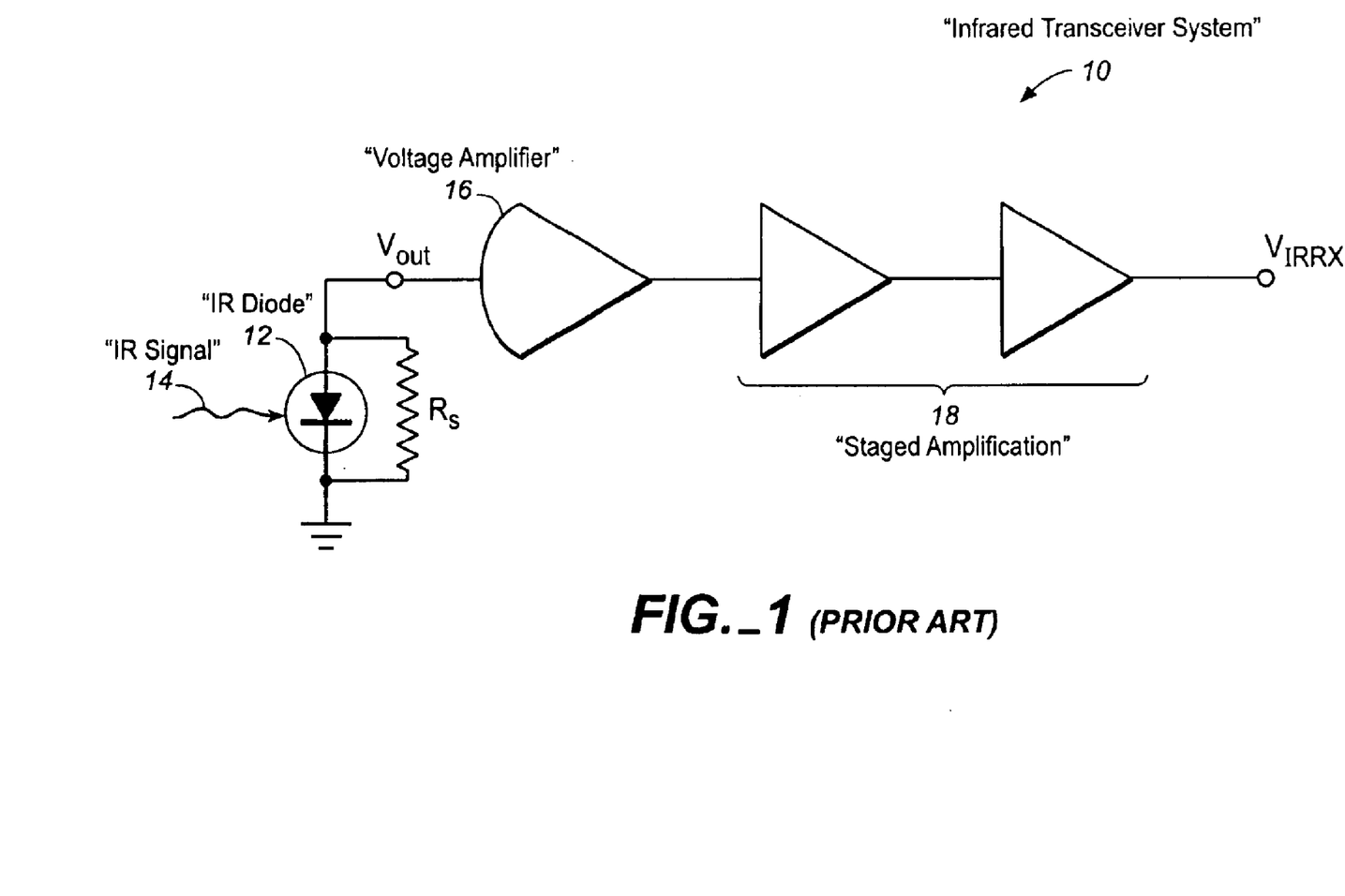
FIG. 1 is a functional diagram of a conventional eared transceiver system.

In a conventional infrared transceiver system 10 depicted by the diagram of FIG. 1, infrared signals 14 are received by an infrared diode 12. These incident infrared signals 14 generate a current within the infrared diode 12, which is conventionally converted to a voltage signal by shunting the system with resistor $R_S$, as shown. This relatively low-voltage signal is then passed through a voltage amplifier 16. The signal then passes through various stages of staged amplification 18 before being carried on out of the system as the output signal $V_{IRRX}$. What should be appreciated is at node $V_{OUT}$ the signal is essentially the incident IR signal 14, plus any noise created by the IR diode 12 or the resistor $R_S$. It should be apparent that the better the signal-to-noise ratio at $V_{OUT}$, the better and cleaner the amplification through the voltage amplifier 16 and the subsequent staged amplification 18.

Figure 2:
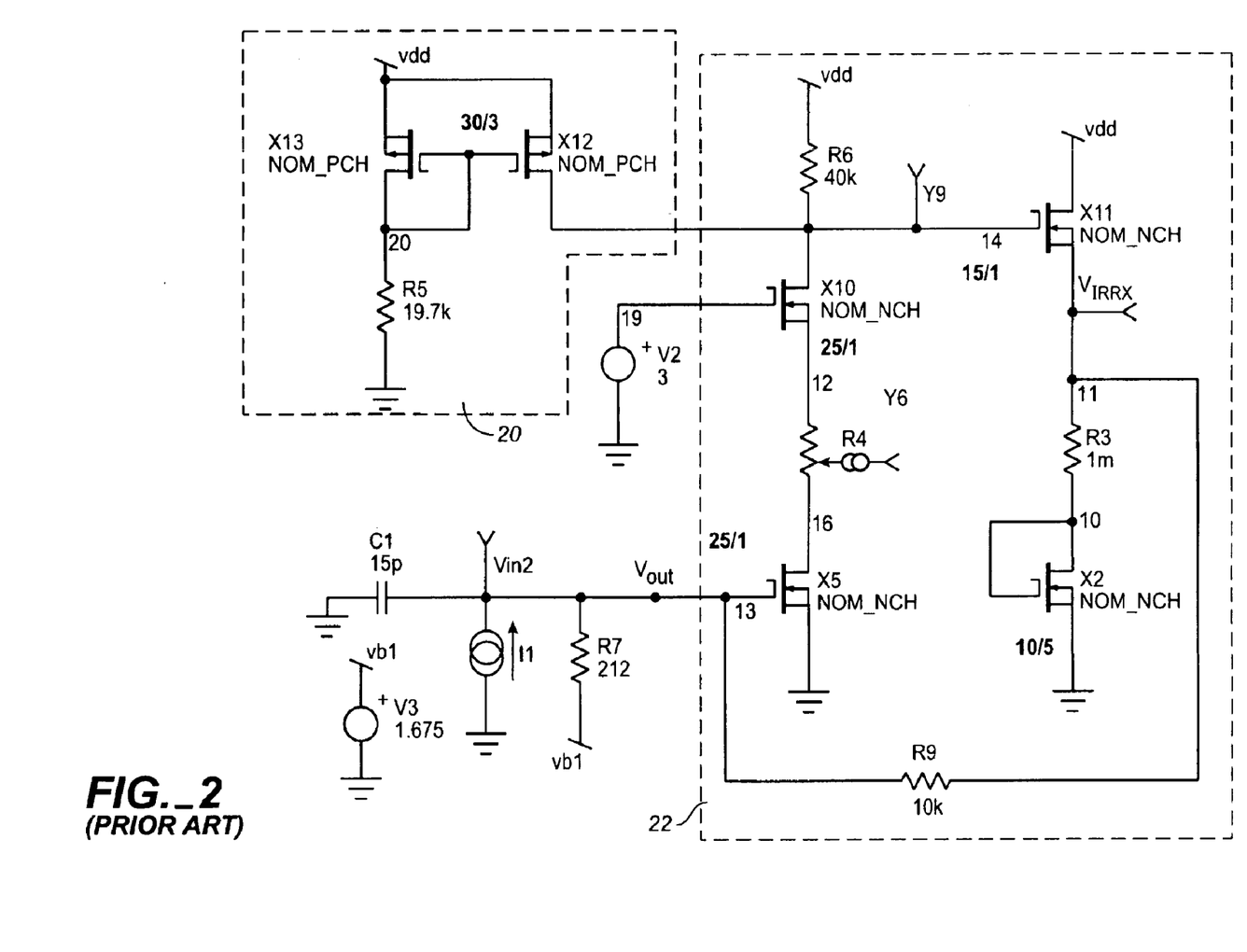
FIG. 2 is a schematic of the conventional infrared transceiver system of FIG. 1.

Now turning to FIG. 2, we can discuss the operation of the conventional system in more depth. FIG. 2 is a schematic of a single-ended version of a conventional infrared transceiver system of FIG. 1. As can be seen in FIG. 2, the IR diode 12 is simulated by current source I1 and capacitance C1. $R_S$ of FIG. 1 is here R7, shunted with the current source. Essentially, what we have in this diagram is a current mirror 20 and a voltage amplifier 22. What should be appreciated from this circuit is that in normal operation the typical input level for fast infrared (FIR) frequency bandwidth will result in approximately 0.5 micro amps of current at current source I1, which results in 106 micro volts across a "real" 212 ohm resistor R7. Under such conditions, the resistor R7 will have a thermal noise of 17.8 micro volts (at 40 MHz frequency bandwidth), which results in a noise ratio of 15.5 decibels without even having entered the amplification stages. If we now look at the operation of the amplifier 22, we can see that typically, it is a high impedance voltage amplifier. The problem with this type of voltage amplifier is that R7, which is required for the specified system bandwidth, also provides additional noise that is added to the incident infrared signal 14 (at $V_{OUT}$) before the signal is amplified—this further decreases the signal-to-noise ratio. It should also be understood that since the "Miller Effect" will apply to the input stage, the value of the intrinsic gate-to-drain capacitance of such a stage is multiplied by the voltage gain. For example, a voltage gain of 10 will result in a "Miller Effect" drain-to-gate capacity of 11 times. In order to achieve the desired bandwidth, a Cascode stage becomes a necessity. The addition of this Cascode stage results in a corresponding addition of another transistor-based noise contribution discussed above (i.e. a total of two equal noise-contributing stages). Consequently, this phenomena further degrades the signal to noise ratio and harms the amplifier performance. Another type of amplifier has been conventionally used, in which R7 is replaced by a feedback resistor. This amplifier has not been discussed herein, since its design is limited to a lower bandwidth, in particular, because of its poor noise performance.

Figure 3:
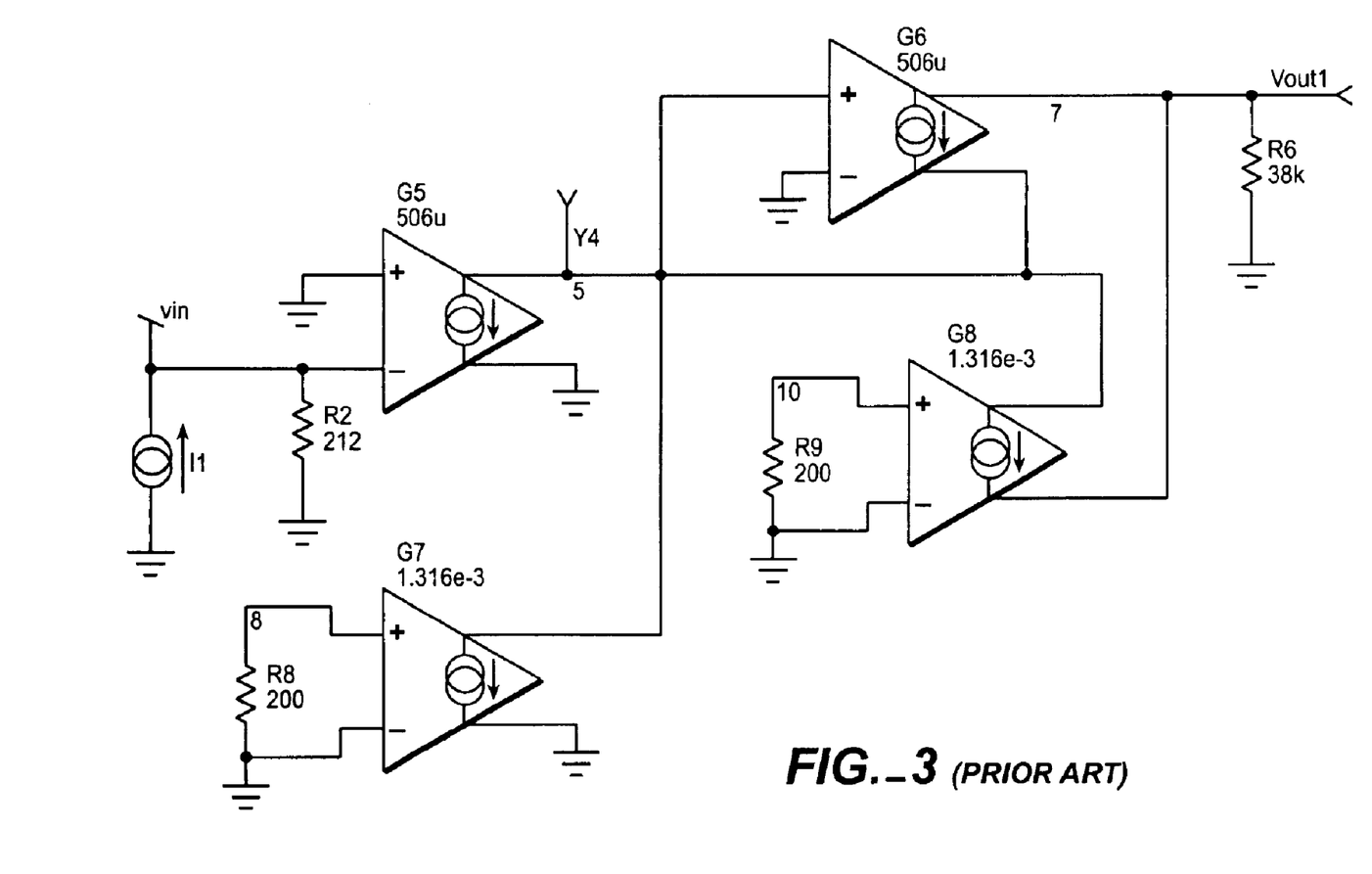
FIG. 3 is a simulation of the circuit of FIG. 2 provided for the purposes of modeling the performance of the circuit.
Figure 4:
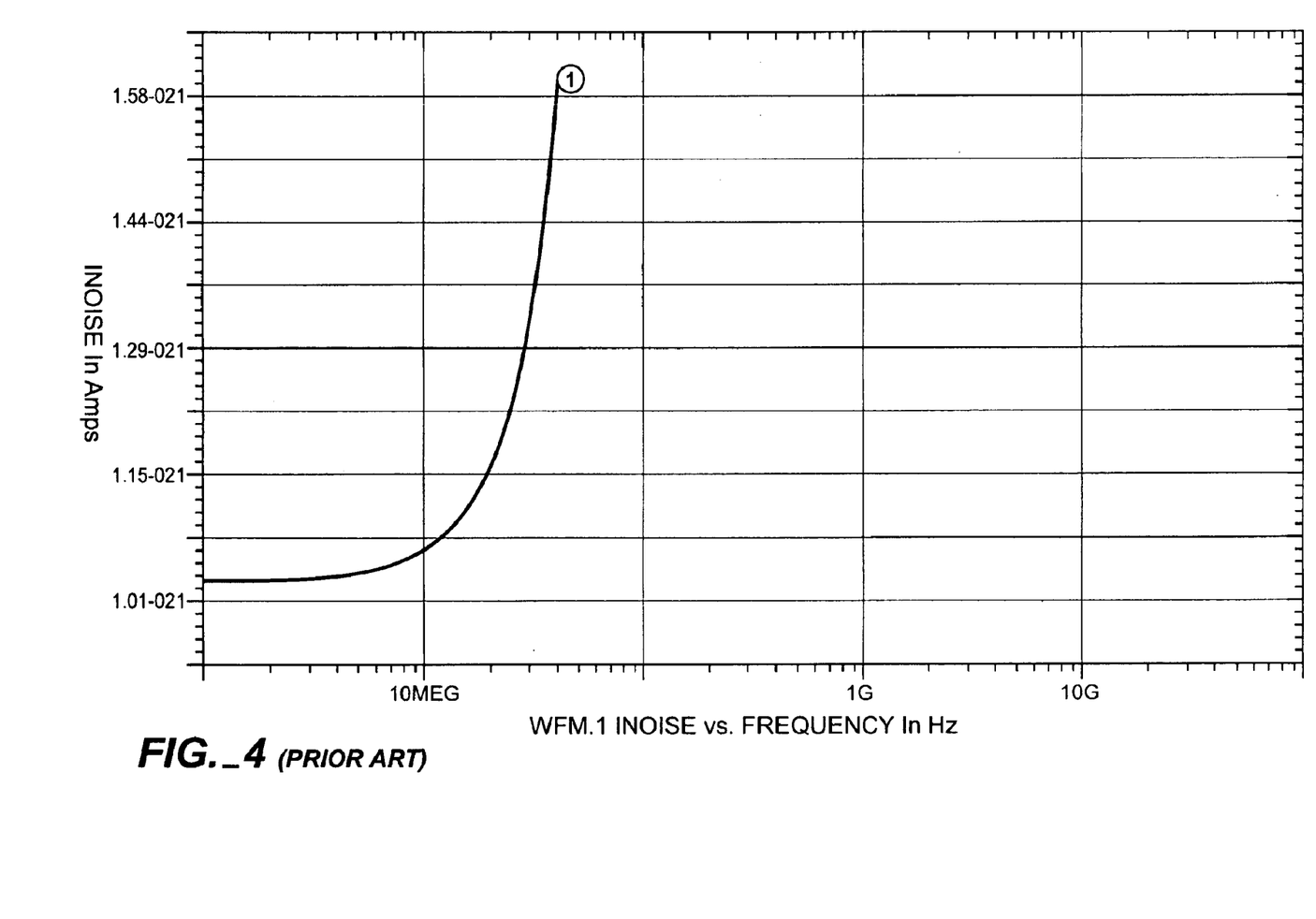
FIG. 4 is a plot of frequency bandwidth of noise to frequency bandwidth for the conventional circuit of FIGS. 1 through 3.
Figure 5:
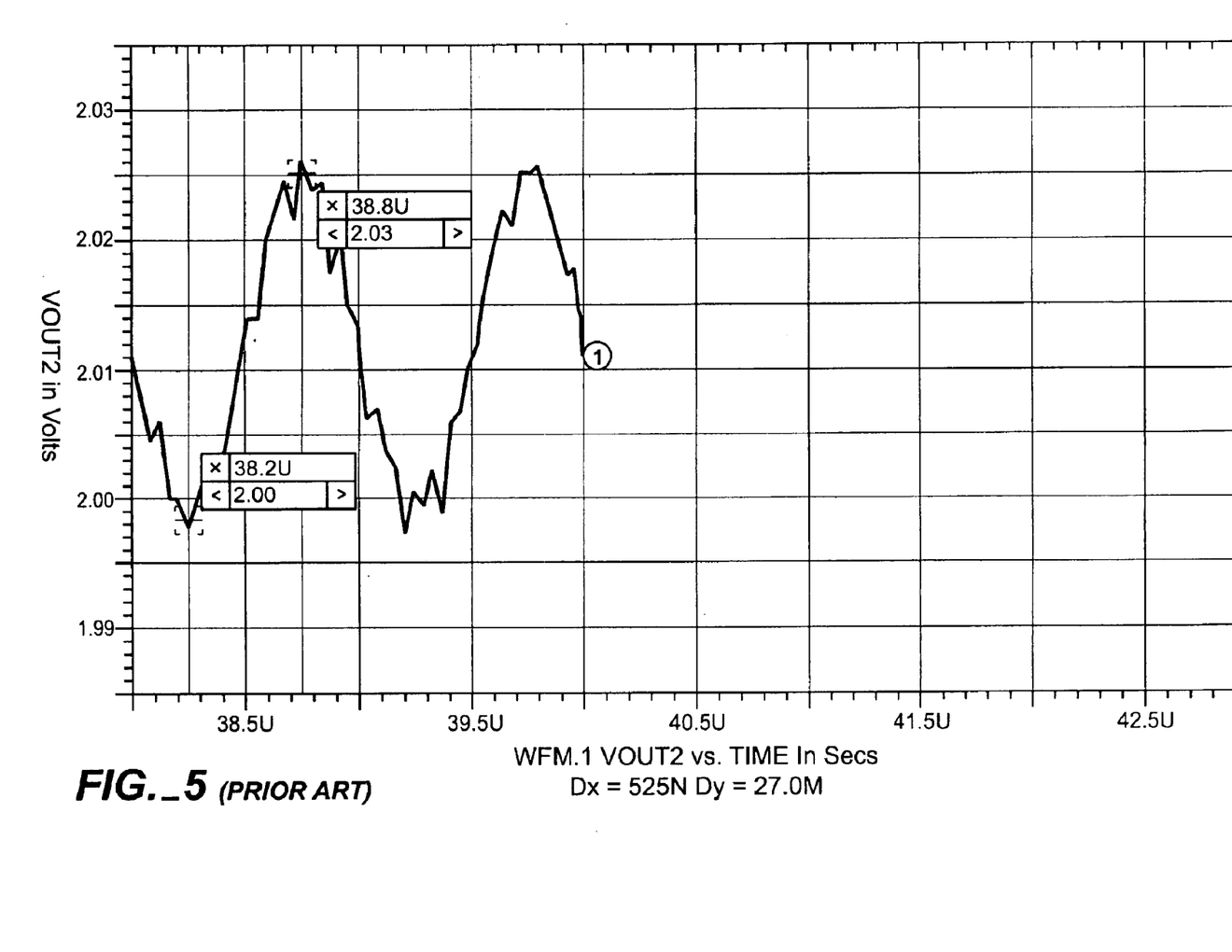
FIG. 5 a plot of output voltage keeping the effect of the high system noise characteristics.

Now turning to FIG. 3, we can see a preferred model for the prior art circuit of FIG. 2. FIG. 3 is a simulation of the circuit of FIG. 2 provided for the purposes of modeling the performance of the circuit; the pertinent results of this modeling are shown in FIGS. 4 and 5. FIG. 4 is a plot of noise vs. frequency bandwidth for the conventional circuit of FIGS. 1 through 3. As can be seen, at a frequency of approximately 40 MHz (which is in the FIR bandwidth), the spot noise is $1.6 \times 10^{-21}/\sqrt{Hz}$ approximately. This number will become more significant once we discuss the improvements of the present invention.

Now turning to FIG. 5 we can see the effect of these noises and capacitance's created in the prior art voltage feedback type amplification circuit. FIG. 5 a response plot of output voltage ($V_{IRRX}$) for the prior system of FIG. 2. As can be seen, the peaks and valleys are extremely erratic and choppy, which creates an unstable signal and ultimately inferior data processing. What is needed is an improved amplifier system to reliably handle in excess of 40 MHz frequency bandwidth.

SUMMARY OF THE INVENTION

In light of the aforementioned problems associated with the prior systems and devices, it is an object of the present invention to provide an Improved Signal Receiver Having Wide Band Amplification Capability. The preferred receiver should be able to receive and reliably amplify infrared and/or other wireless signals having frequency bandwidths in excess of 40 MHz. It is an object of the present invention to reduce the signal-to-noise ratio of the received signal to $\frac{1}{5}^{th}$ of the prior systems. In its preferred form, the receiver will eliminate both shunting and feedback resistors on the input end by amplifying the signal in current form. Furthermore, the receiver will include transconductance amplification means for amplifying the current signal without the need for Cascode stages. It is a further object that the receiver include staged amplification to amplify the current signal in stages prior to converting the signal into a voltage output.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an Improved Signal Receiver Having Wide Band Amplification Capability.

Figure 6:
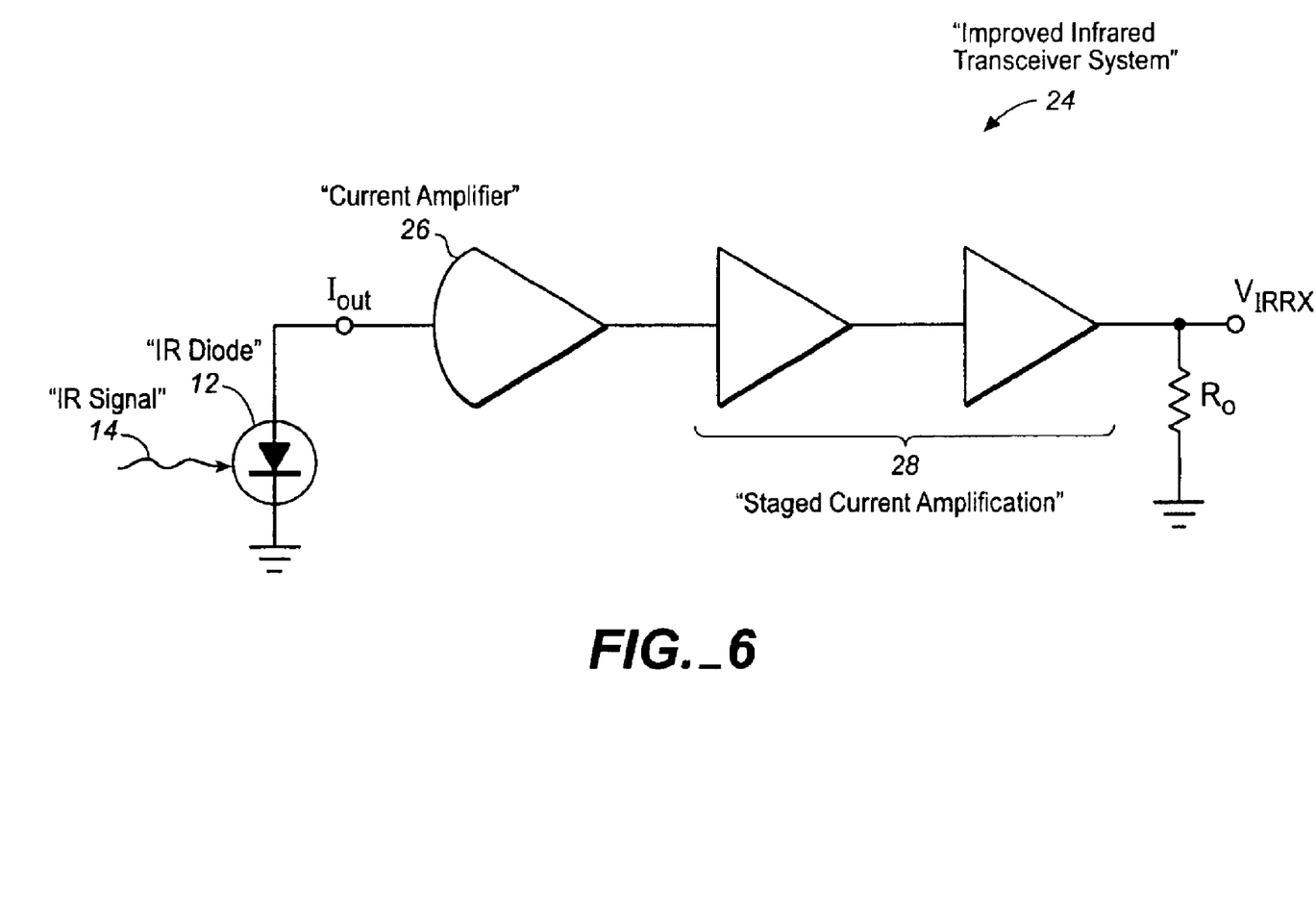
FIG. 6 is a functional diagram of an improved infrared transceiver system of the present invention using current amplification.

The present invention can best be understood by initial consideration of FIG. 6. FIG. 6 is a functional diagram of an improved infrared transceiver system 24 of the present invention, employing current amplification. In this system 24, the IR signals 14 incident upon the IR diodes remain in the form of a current ($I_{OUT}$). The Current ($I_{OUT}-I_F$) develops voltage across $R_{INEFF}$ (Effective Input Resistance=$R_{IN}/(1+\beta A_{OL})$). This voltage is multiplied by the Transconductance of the current amplifier 26, producing a current through $R_L$, giving a voltage input to the buffer 32. This pre-amplifier output voltage is converted to a feedback current ($I_F$) by device X3. $I_F$ is then combined with $I_{OUT}$ which results in a reduction in the size of $R_{IN}$ (noiselessly), which ultimately improves the bandwidth of the system.

Figure 7:
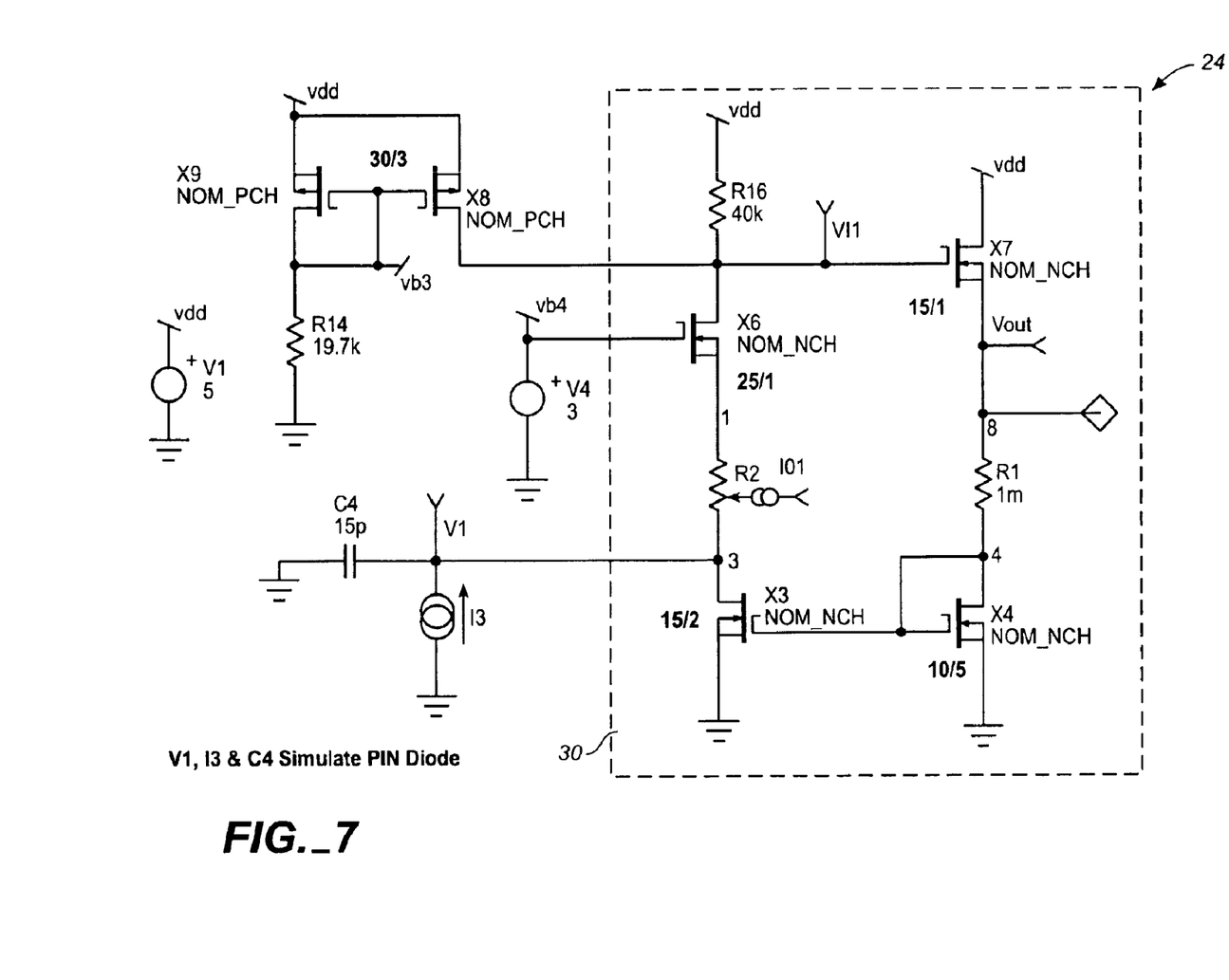
FIG. 7 is a preferred circuit design of the circuit of FIG. 6.

Now turning to FIG. 7, we can see the preferred circuit design for the improved transceiver system 24 of FIG. 6. As can be seen, in this case, current generator 13 and capacitor C4 simulate the IR diode 12. In contrast to the prior voltage-type amplifier depicted in FIGS. 2 and 3, the amplifier 30 of this FIG. 7 is a transimpedence-type amplifier. With the transimpedence amplifier, since there is typically no resistive feedback loop (i.e. there is no feedback resistor), the intrinsic system noise is substantially reduced. Furthermore, the significant benefit of using this topology for the transimpedence amplifier is that it does not result in a Miller effect, and therefore there is only a noise contribution from a single input stage (since the full Cascode stage is rendered unnecessary by the absence of a Miller effect). The result is an amplifier that is capable of extremely high signal-to-noise ratios, in addition to very good bandwidth, since $R_{INEFF}$ is equal to $R_{IN}/(1+\beta A_{OL})$.

In order to potentially achieve further performance improvements, the transistors X3, X6, X7 and/or X4 might include dynamically-adjustable bias voltage control in order to operate these transistors in the "weak inversion" range for certain portions of their operational curves. Since weak inversion operations are well known in the art, the particulars of this operational mode are not discussed herein. For the purposes of this discussion, a 0.7μ CMOS process is employed; it should be understood that additional system capacitance reductions (and therefore performance improvements) might be achievable through the use of smaller geometry.

Figure 8:
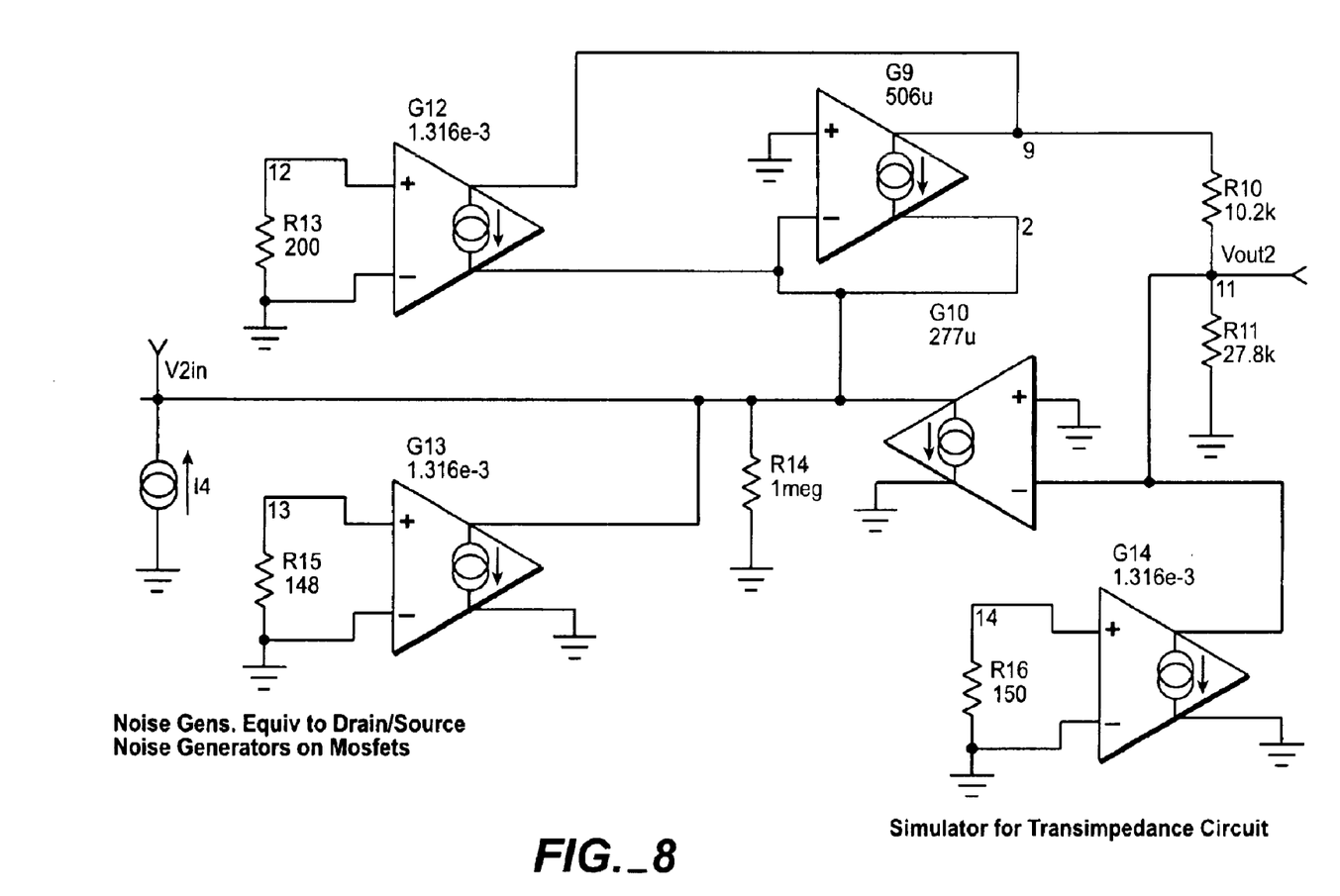
FIG. 8 is a circuit model of the circuit of FIGS. 6 and 7.
Figure 9:
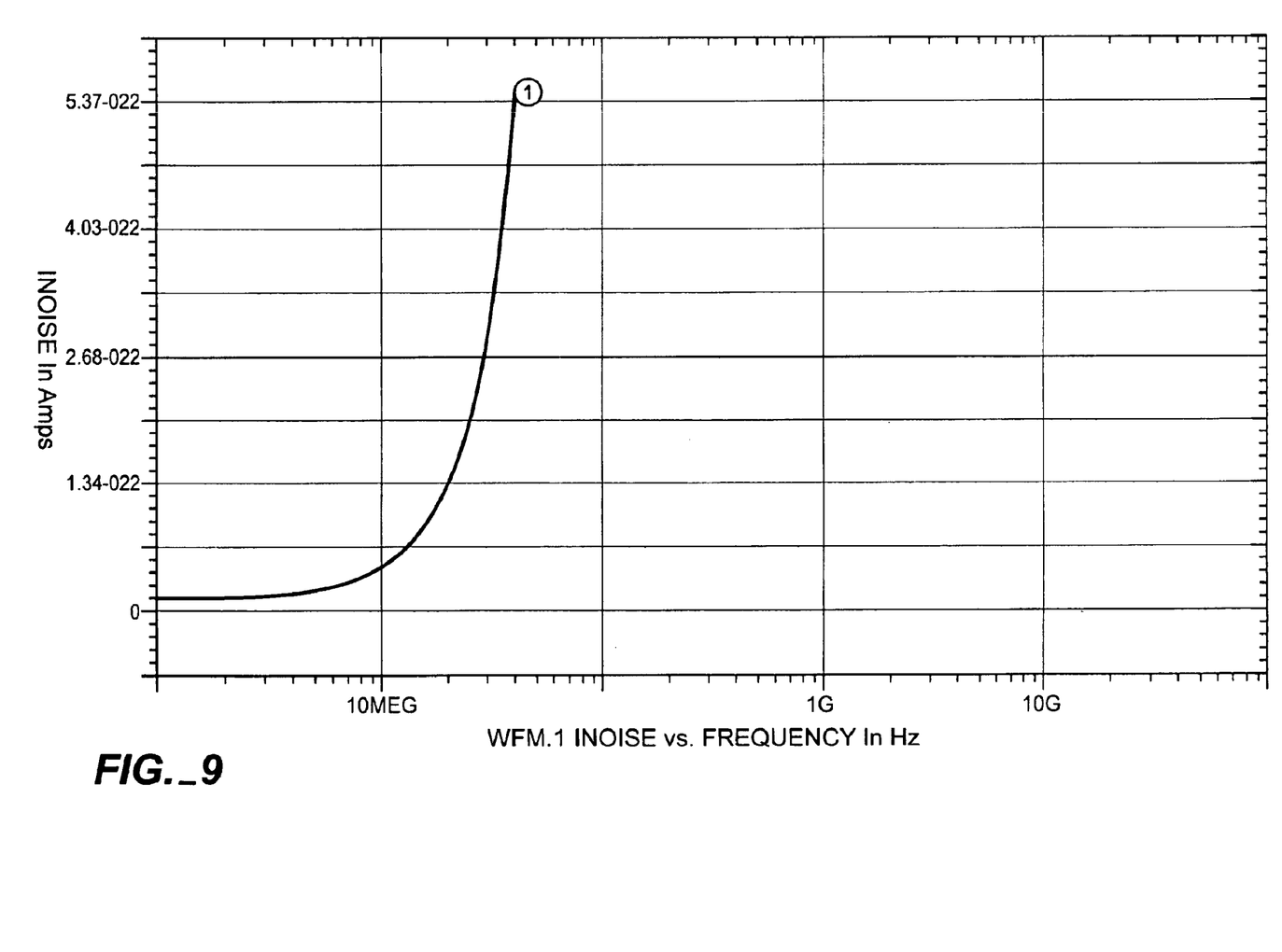
FIG. 9 is a plot of noise versus bandwidth of the circuit of FIGS. 6, 7, and 8.

FIG. 8 is a circuit model of the circuit of FIGS. 6 and 7 constructed in order to provide simulation data on the circuit, as reported below in FIGS. 9 and 10. FIG. 9 is a plot of noise versus frequency bandwidth of the circuit of FIGS. 6, 7, and 8. If we look at the 40 MHz line we can see that the spot noise at $0.54 \times 10^{-21}/\sqrt{Hz}$ this point is This compares to $1.6 \times 10^{-21}$ of the prior circuit, or approximately ⅓ the spot noise at equivalent frequency in the new circuit of FIG. 7 (as compared to the old circuit of Figure 2), which equates to a 13 dB improvement when integrated over the full frequency range. Also, at 3 dB signal-to-noise ratio, the frequency bandwidth exceeds 64 MHz.

Figure 10:
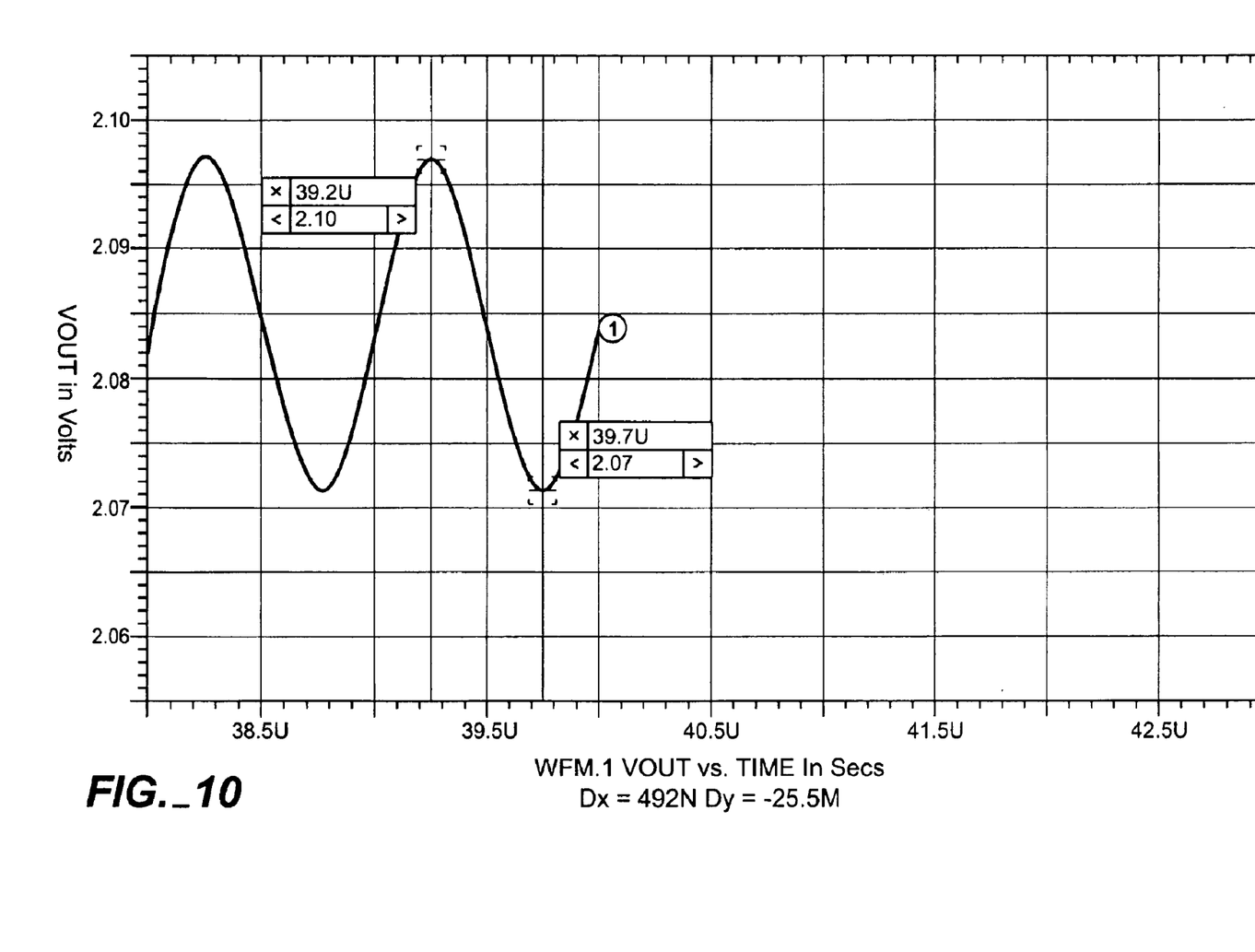
FIG. 10 is a plot of output voltage of the circuit of FIGS. 6, 7, 8, and 9.

As can be seen from FIG. 10, the improvement in responsiveness of the transimpedence solution is dramatic. FIG. 10 is a plot of output voltage of the circuit of FIGS. 6, 7, 8, and 9. In contrast to the sawtooth response curve of FIG. 5, FIG. 10 shows a smooth output through several signal pulses. It should be understood from FIGS. 9 and 10 that the device of the present invention will provide extremely high bandwidths with low noise while at the same time giving very, very smooth response. It also should also be understood that while throughout this application the embodiments discussed have been in regard to infrared signal receipt, this method can also be expected to provide the same benefits for other wireless signal receipt, for example radio frequency, and in particular cellular phones and other devices. Through application of this technology it is believed that the noise improvement of 15 to 16 decibels will result in an incredible increase in-range and coverage that heretofore has not been achievable.

Theoretical Noise Comparison to the Prior Art

The following analysis is provided in order to further explain the significant benefits of the signal receiver of the present invention. A noise comparison between the prior art amplifier and the amplifier of the present invention revolves around the input transistor and the input resistor, since the system signal-to-noise ratio is essentially determined at this point in the respective circuits. In the prior art circuit (see FIG. 2), R7 is the input resistor, X5 is the input transistor— as discussed above, X5 is a Cascode connection. In the preferred circuit of the present invention, there is NO input resistor, as well as NO Cascode connection.

Input Resistor Contribution

In the prior circuit, assume that a Bandwidth of 40 MHz drives R7 to be 265 Ω (in order to have adequate gain without decreasing the signal-to-noise ratio to an unacceptable level). The formula for RMS noise generated in a resistor is:

$$i_{RMS}(\text{resistor}) = \sqrt{\frac{4xkxT}{R}}$$

, where:
  k=Boltzman's constant=$1.38 \times 10^{-23}$
  T=Temperature (deg. Kelvin)=290
  R=Resistor value=265
, such that:

$$i_{RMS}(R7) = \sqrt{\frac{4 x 1.38 \times 10^{-23} x 290}{265}} = 49.16 \, nanoAmperes$$

Input Transistor Contribution

The thermal noise of one input MOSFET is calculated by the following formula:

$$i_{RMS}(MOSFET) = \sqrt{\left\{\frac{8xkxT}{3}\right\} x \sqrt{2x\beta xId}}$$

, where:
  β=K'×W/L

K' is a transconductance parameter=$30.3 \times 10^{-6}$

W/L are width and length dimensions of the MOSFET= 55/1 (therefore $\beta=7.575 \times 10^{-4}$)

Id is the MOSFET drain current=$60 \times 10^{-6}$ (for this case), such that:

$$i_{RMS}(MOSFET) = \sqrt{\left\{\frac{8 \times 1.38 \times 10^{-23} \times 290}{3}\right\} \times \sqrt{2 \times 7.575 \times 10^{-4} \times 60 \times 10^{-6}}}$$

$i_{RMS}$(MOSFET)=11.34 nanoAmperes

Comparison between the Circuits:

Assume that the input current source may drop as low as 250 nanoAmperes (fairly common for infrared communications).

The prior circuit's input components' noise:

$i_{RMS}$(input)=$i_{RMS}$(R7)+$i_{RMS}$(MOSFET)

, but since X5 is Cascode-connected, there are essentially two noise contributions, making the combined contribution equal to the square root of their squared contributions, therefore:

$$i_{RMS}(\text{input}) = \sqrt{i_{RMS}(R7)^2 + 2 \times \{i_{RMS}(MOSFET)\}^2}$$

$$i_{RMS}(\text{input}) = \sqrt{49.16^2 + 2 \times \{11.3\}^2} = 51.6\,nanoAmperes$$

The preferred circuit of the present invention's input components' noise Since there is no input resistor, the formula for the comparable noise current is simply:

$i_{RMS}$(input)=$i_{RMS}$(MOSFET)

$i_{RMS}$(input)=11.34 nanoAmperes

Signal-to-Noise Ratio Comparison:

S:N(prior circuit)=250:51.6=4.85:1

S:N(present invention)=250:11.34=22.0:1!

This represents over 5 (five) times the signal-to-noise ratio of the prior circuit, which, when coupled with the superior frequency performance described previously, clearly demonstrates the previously-unknown benefits of the present circuit and method over the prior devices and methods.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved infrared transceiver system comprising:
   a first sensor for detecting infrared signals incident thereon and converting said signals to an electrical current signal;
   a gain controller for amplifying said current signals;
   a voltage converter for converting said current signals into voltage signals; and
   a staged current amplifier in circuit between said gain controller and said voltage converter, said staged current amplifier comprised of at least two amplification stages, each of said stages amplifying said current signals, wherein said gain controller comprises a current mirror in operative connection with said staged current amplifier and further wherein said staged current amplifier comprises:
   a first transistor, said first transistor comprising a first drain and a first gate;
   a second transistor, said second transistor comprising a second source and a second drain, said second source being in circuit with said first drain;
   a third transistor, said third transistor comprising a third gate and a third source, said third gate being in circuit with said second drain; and
   a fourth transistor, said fourth transistor comprising a fourth drain and a fourth gate, said fourth drain in circuit with said fourth gate and said first gate.

2. The system of claim 1, wherein said current mirror is in circuit with said second drain and said third gate.

3. The system of claim 1, further comprising an output terminal, said output terminal being in circuit with said third source and said fourth drain.

4. The system of claim 3, wherein each of said transistors comprises a bias voltage, and wherein said bias voltage is dynamically adjustable in order to operate each of said transistors in a weak inversion range.

5. An improved wireless signal receiver system comprising:
   a first sensor for detecting wireless signals incident thereon and converting said signals to an electrical current signal;
   a gain controller for amplifying said current signals; and
   a voltage converter for converting said current signals into voltage signals;
   wherein said gain controller further comprises a staged current amplifier operating in the weak inversion range, and a current mirror in operative connection with said current amplifier; and wherein said current amplifier comprises:
   a first transistor, said first transistor comprising a first drain and a first gate;
   a second transistor, said second transistor comprising a second source and a second drain, said second source being in circuit with said first drain;
   a third transistor, said third transistor comprising a third gate and a third source, said third gate being in circuit with said second drain; and
   a fourth transistor, said fourth transistor comprising a fourth drain and a fourth gate, said fourth drain in circuit with said fourth gate and said first gate.

6. The system of claim 5, wherein said current mirror is in circuit with said second drain and said third gate.

7. The system of claim 5, further comprising an output terminal, said output terminal being in circuit with said third source and said fourth drain.

8. The system of claim 7, wherein each of said transistors comprises a bias, voltage, and wherein said bias voltage is dynamically adjustable in order to operate each of said transistors in a weak inversion range.

* * * * *